United States Patent [19]
Amesbury

[11] 4,072,406
[45] Feb. 7, 1978

[54] CAMERA PERISCOPE WITH LOUVERS FOR CONTROLLING LIGHT SCATTERING

[76] Inventor: Maurice G. Amesbury, 22552 Lark Spring Terrace Diamond Bar,, Los Angeles, Calif. 91765

[21] Appl. No.: 697,202

[22] Filed: June 17, 1976

[51] Int. Cl.$^2$ .............................................. G02B 27/14
[52] U.S. Cl. .................................. 350/173; 350/276 R
[58] Field of Search ............... 350/173, 172, 169, 174, 350/276 R, 19, 287, 52, 301, 319; 354/150, 75, 76, 79, 81, 82; 352/94, 95, 131, 132, 243; 33/266

[56] References Cited
U.S. PATENT DOCUMENTS

| 1,470,770 | 10/1923 | Siedentopf | 350/173 |
| 3,133,140 | 5/1964 | Winchell | 350/65 |
| 3,672,782 | 6/1972 | Akin | 350/174 |
| 3,709,124 | 1/1973 | Hunt | 354/79 |
| 3,796,477 | 3/1974 | Geraci | 350/65 |

*Primary Examiner*—Jon W. Henry
*Attorney, Agent, or Firm*—Roger A. Marrs

[57] ABSTRACT

A camera periscope presenting low visual obstruction to the viewer is disclosed herein having a housing carried on a camera body enclosing image conveying components between a front open window and a camera lens. The housing includes an open window through which the viewing image is conveyed to a beam splitter device so that the image branches along a first optical axis to the eye of the viewer and along the second optical axis to the camera lens. The front and rear panels of the periscope housing utilize light control films or panels so that the viewer has sufficient vertical tolerance of his eye position and yet stray light is prevented from reaching the camera lens. The sides of the housing are of opaque material including thin or narrow transverse bridges employed to support the light control films or panels so that the viewers visual image is not substantially obstructed thereby.

7 Claims, 5 Drawing Figures

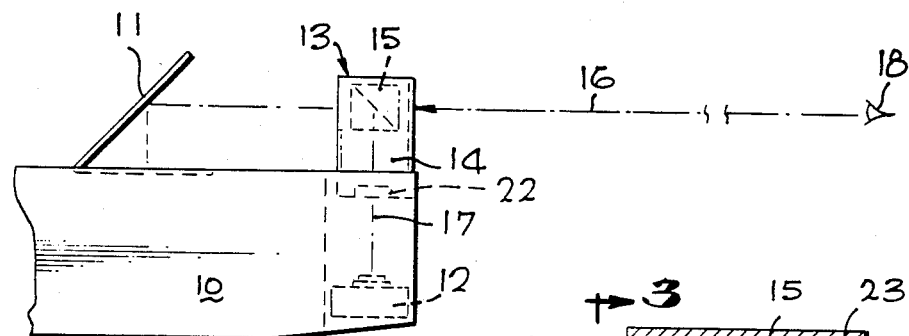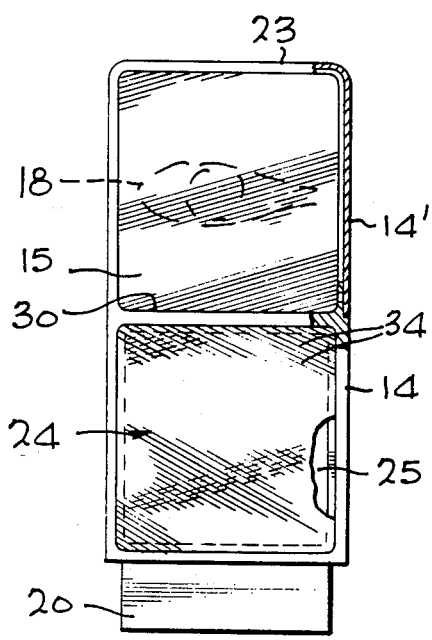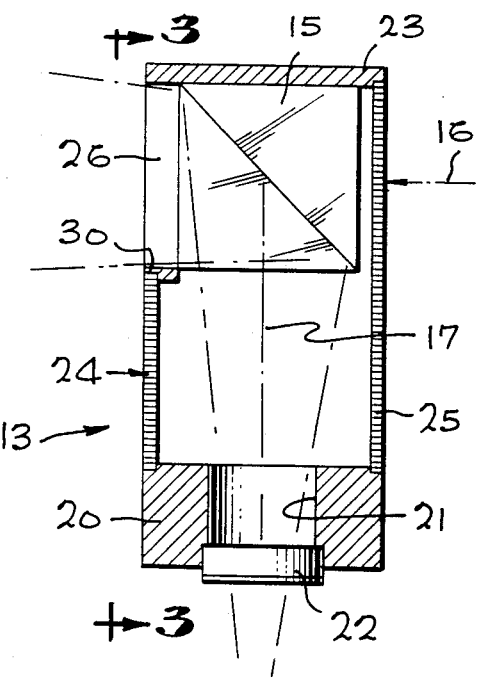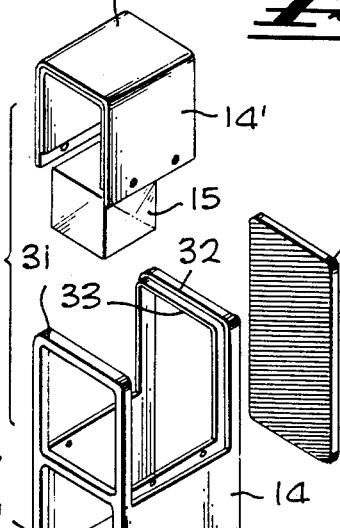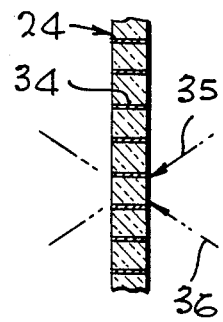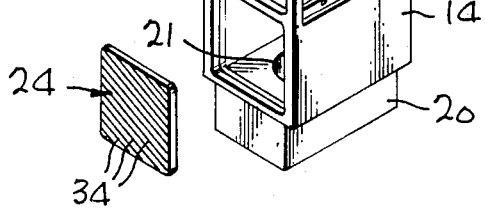

CAMERA PERISCOPE WITH LOUVERS FOR CONTROLLING LIGHT SCATTERING

BACKGROUND OF THE INVENTION

1. Field of the Invention

This invention relates to camera periscopes and more particularly to a novel periscope construction providing substantially full viewing of the visual image by the viewer with suppression of stray light normally scattered into the lens of the camera.

2. Brief Description of the Prior Art

In the past, it has been a conventional practice to mount a movie camera onto a gunsight carried on an aircraft so that a film record may be taken of the pilot's aiming and firing procedures with respect to the gunsight and the target. To achieve this purpose, the camera is usually mounted below the gunsight and a small periscope attached to the camera lens projects upwardly between the viewers eye and the gunsight target information displayed on the combining glass having the range or other pertinent lines scribed or otherwise projected thereon. However, the camera periscope frequently constitutes a major obstruction between the pilot's eye and the gunsight target information so that the viewer must make constant adjustments for the obstruction by moving his head or body so as to clearly see the target information on the combining glass.

In an effort to reduce the obstruction of the periscope, attempts have been made to construct periscopes entirely of glass or other transparent materials. Difficulties have been encountered in these attempts which are due primarily to the fact that stray light is scattered into the camera lens which causes loss of image contrast and resolution. Therefore, the viewer must accept the disadvantages of a large obstruction in his line of sight or the viewer must accept the disadvantages of contrast and resolution loss caused by scattering of stray light.

Therefore, a long standing need has existed to provide a novel camera periscope which will not substantially obstruct the viewing of gunsight target information by the viewer and yet which will reduce the effects of scattered stray light.

SUMMARY OF THE INVENTION

Accordingly, the above problems and difficulties are obviated by the present invention which provides a novel camera periscope which includes a housing having front and rear panels which are substantially transparent so as to be unobstructive to the eye of the viewer and which include front and back panels composed of light control film which prevents stray light from reaching the camera lens element. The housing includes an open window through which the viewer observes target information and directly behind the open window is a beam splitter device which branches the optical axis of the viewer into a second optical axis directed into the camera lens per se. The housing includes thin walls or bridges for mounting the front and rear films or panels so that reduced obstruction is provided from that ordinarily encountered by the viewer. The light control films or panels on the front and rear of the housing are offset from each other so that severe eye obstructing patterns are reduced or eliminated.

Therefore, it is among the primary objects of the present invention to provide a new and novel camera periscope which not only controls stray light collected within the housing of the periscope but which includes a housing which is relatively unobstructed to the eye of the viewer.

Another object of the present invention is to provide a novel camera periscope having light control films or panels which prevent stray light from reaching the camera lens and yet provides a transparent enclosure for the housing of the periscope.

ANOTHER object of the present invention is to provide an improved periscope mounting on a camera which includes louvered light control panels for film that are offset or angularly disposed with respect to each other for avoiding undesired patterns.

STILL a further object of the present invention is to provide an improved gunsight camera periscope having an accepted angle of the louvered light control film so that the viewer has suffiicent vertical tolerance of his eye position and simultaneously preventing stray light from reaching the camera lens.

A further object of the present invention is to provide a novel gunsight camera periscope having means for improving image resolution and contrast by employing light control film to avoid image distortion or degradation.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a diagrammatic illustration of a gunsight camera installation showing the relative position of the combining glass, viewer and the periscope disposed therebetween;

FIG. 2 is an enlarged longitudinal cross sectional view of the camera periscope shown in FIG. 1 incorporating the present invention;

FIG. 3 is a front elevational view of the camera periscope shown in FIG. 2 and taken in the direction of arrow 3—3 thereof;

FIG. 4 is an exploded view of the camera periscope illustrated in FIGS. 1–3; and FIG. 5 is an enlarged transverse cross sectional view of a typical light control film employed in the front and rear covers for the housing of the camera periscope.

DESCRIPTION OF THE PREFERRED EMBODIMENT

Referring to FIG. 1, an aircraft gunsight is illustrated in general by the numeral 10 which is intended to be carried in a cockpit of the aircraft immediately ahead of the pilot so that his line of vision will permit viewing of a combining glass 11 which carries the necessary gunsight target information. It is conventional practice to display the information on the combining glass by scribing range lines or marks on the screen or glass or, the information may be projected on this glass by a separate optical system. In order to record the target information displayed on the combining glass 11, the gunsight is provided with a camera 12 which is generally located away from the line of sight established between the viewer or pilot and the glass 11. Therefore, in order to record the target information displayed on the glass, a novel camera periscope 13 is disposed along the line of sight and in alignment with the camera lens. The camera periscope 13 includes housing 14 which carries a glass cube beam-splitter 15 so as to divide the target information image into a pair of branches indicated by numeral 16 which is observed by the viewer and by line 17 which is directed into the lens of the camera. It is also to be noted that the camera periscope 13 is interposed between the target information displayed on the glass 11 and the viewer's eye indicated in general by numeral 18. Therefore, it is of utmost importance that the periscope, which is an obstruction since it lies on the line of sight, be as transparent as possible in the direction of the line of sight.

Referring now in detail to FIG. 2, it can be seen that the camera periscope 13 includes a base 20 which is formed with an aperture 21 in which a conventional filter 22 is disposed. A filter 22 is in close proximity to the lens of the camera for conducting the split image along optical axis 17. The base 20 carries a housing 23 which supports a front light control means 24 and a rear light control means 25. These latter means 24 and 25 are panels or films such as is produced and distributed by the visual products of the 3M Company located in St. Paul, Minn. Such films or panels are zero degrees clear with a plurality of single plane louvers. The louvers are set at an angle of approximately 10° laterally relative to the horizontal plane. Details of the light control means or film will be described with reference to FIG. 5 later in this specification.

The upper section of the periscope includes the glass cube beam-splitter 15 which conveys the target/gunsight image to the camera lens. The beam-splitter has a 30% reflection figure and therefore appears translucent to the pilot's eye represented by numeral 18. The rear light control panel or cover 25 forms the entire rear surface of the periscope which is transparent to the viewer's eye. Therefore, it can be seen that the housing 14 includes an open window defined by numeral 26 which leads to the front of the beam-splitter cube 15. The image is then conducted along the line of sight 16 to the viewer and along the camera lens' image line 17 to the camera lens. The front and rear covers 24 and 25 adequately control the scattering of light within the confines of the housing so that the scattered light is not conveyed, conducted or transmitted to the camera lens via filter 22.

Referring now in detail to FIG. 3, a view of the camera gunsight periscope 13 is illustrated showing the periscope from the front so that the viewer's line of sight is obstructed only by the thin thickness areas of the housing 14 and the central or mid-way bridge 30. The cube 15 does not represent an obstruction or opaque blockage to the eye of the viewer 18 and neither does the front or rear panels 25. It is noted that the housing 14 includes an upper cap or cover 14' which incorporates the top 23 of the housing. This relationship is more clearly shown in FIG. 4 as well as the overall assembly of the component parts.

In FIG. 4, the housing 14 includes a pair of upright frames 31 and 32 which include flange members identified in general by numeral 33 on which the upper housing 14' is disposed. The upper housing portion 14' may be suitably carried on the frames 31 and 32 via the flanges 33 by any suitable means such as small set screws, glue, adhesive or other fastening means. In a similar fashion, the cube 15 is suitably glued to the upper housing portion 14' and is carried therewith as a unit. The panels 24 and 25 are recessed within the frames provided on the lower portion of housing 14. It is again emphasized that the light control means taking the form of films 24 and 25 are not assembled ahead of or in front of the beam-splitter cube 15. The incorporation of a film in this area would degrade the image which is introduced to the beam-splitter and conducted into the two branches 16 and 17. It is also to be particularly noted that the louvered light control films 24 and 25 are not mounted so that the louvers are horizontal in parallel relationship with each other. If so mounted, severe "herringbone" patterns result which is undesirable. Therefore, the present invention includes the feature of mounting the film so that the respective louvers are at an angle to each other. Preferably, the louvers are set at an angle of approximately 10° laterally respective to the horizontal.

Referring now in detail to FIG. 5, a greatly enlarged cross sectional view is shown of a typical light control means. Light control film 24 is illustrated and it is to be understood that film 25 is identical in construction. Each of the light control films is a thin plastic sheet incorporating closely-spaced micro louvers. The film functions like a tiny venetian blind to enhance contrast for better visibility, reduce glare and establish limited viewing angle either vertically or horizontally. The film is a cellulose acetate butyrate containing embedded louvers. Numeral 34 illustrates one louver and the dotted or broken line arrows 35 and 36 illustrate the transmission of light rays through one side of the film. The transmittance of light decreases for light incident at other angles, until zero transmittance is reached and this is known as the cut-off angle. The light control film is a standard product of the visual products division of the 3M Company and may be purchased from them through their center in St. Paul, Minn. 55101.

In view of the foregoing, it can be seen that the camera gunsight periscope of the present invention is disposed on the gunsight in a direct line position between the viewer and the display of target information on the combining glass 11. Although the periscope is in direct line relationship, viewing of the gunsight information as well as the target image is not substantially obstructed by the periscope since the only solid obstruction is the thin framework of the housing and the bridge 30. The front and the back of the periscope are open to the light and for viewing by the viewer due to the light control film. The films are effective and efficient methods of controlling light direction and enhancing a contrast of low-level light display. However, in the present application, the light control film prevents stray light from reaching the camera lens. Therefore, the inventive concept of the present invention provides a novel gunsight periscope which is substantially unobstructive to the eye of the viewer which prevents the scattering of stray light into the camera lens which would normally cause loss of contrast and resolution.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A periscope for mounting onto a gunsight
   along the line of sight between a viewer and a target display, the combination comprising:
   an elongated housing;

a beam-splitter cube mounted on said housing on said line of sight;
means incorporated into said beam-splitter cube for branching an image simultaneously to the viewer and to the lens of a camera;
front and rear panels carried on said housing of light transparent material so as to avoid obstruction of the viewer's line of sight;
said housing having opposite sides of opaque material;
said front and rear panels are light control films; and
said light control films comprise microlouvers for controlling the scattering of stray light introduced to said housing.

2. A periscope for mounting onto a gunsight along the line of sight between a viewer and a target display, the combination comprising:
an elongated housing;
a beam-splitter cube mounted on said housing on said line of sight;
means incorporated into said beam-splitter cube for branching an image simultaneously to the viewer and to the lens of a camera;
front and rear panels characterized as light control means carried on said housing of light transparent material so as to avoid obstruction of the viewer's line of sight;
said housing having opposite sides of opaque material;
said light control means included in said front and rear panels comprising a plurality of louvers for controlling the scattering of stray light introduced to the interior of said housing.

3. The invention as defined in claim 2 wherein said light control louvers are fixed in position on each of said panels in fixed spaced apart relationship.

4. The invention as defined in claim 2 wherein said housing includes an opening directly ahead of said beam-splitter cube for introducing the image directly thereto.

5. The invention as defined in claim 4 wherein said front light control film is disposed below said housing opening and separated therefrom by a bridge.

6. The invention as defined in claim 5 wherein said louvers in each film are parallel to each other.

7. The invention as defined in claim 6 wherein said louvers in said front and rear panels are angularly disposed with respect to each other.

* * * * *